US010397157B2

(12) United States Patent
Celedonia et al.

(10) Patent No.: US 10,397,157 B2
(45) Date of Patent: Aug. 27, 2019

(54) MESSAGE MANAGEMENT IN A SOCIAL NETWORKING ENVIRONMENT

(71) Applicant: International Business Machines Corporation, Armonk, NY (US)

(72) Inventors: Michael A. Celedonia, Wake Forest, NC (US); Robert Koplowitz, Oakland, CA (US); Ram Krishnamurthy, Westford, MA (US); John M. Lance, Littleton, MA (US); Laura J. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 15/335,649

(22) Filed: Oct. 27, 2016

(65) Prior Publication Data
US 2018/0123997 A1  May 3, 2018

(51) Int. Cl.
| G06F 15/16 | (2006.01) |
| H04L 12/58 | (2006.01) |
| H04L 29/08 | (2006.01) |
| G06Q 50/00 | (2012.01) |
| G06F 17/27 | (2006.01) |
| G06Q 10/10 | (2012.01) |

(52) U.S. Cl.
CPC ............ *H04L 51/18* (2013.01); *G06Q 50/01* (2013.01); *H04L 67/306* (2013.01); *H04L 67/34* (2013.01); *G06F 17/271* (2013.01); *G06F 17/277* (2013.01); *G06F 17/2785* (2013.01); *G06Q 10/10* (2013.01); *G06Q 10/107* (2013.01); *G06Q 10/109* (2013.01); *H04L 51/063* (2013.01); *H04L 51/32* (2013.01)

(58) Field of Classification Search
CPC ....... H04L 51/18; H04L 51/063; H04L 51/32; H04L 67/306; H04L 67/34; G06F 17/218; G06F 17/271; G06F 17/274; G06F 17/277; G06F 17/2785; G06Q 10/10; G06Q 10/107; G06Q 10/109; G06Q 50/01
USPC .................. 709/204, 205, 206, 207; 705/319
See application file for complete search history.

(56) References Cited

U.S. PATENT DOCUMENTS

| 8,543,656 B2 | 9/2013 | Khoo |
| 9,077,672 B2 | 7/2015 | Khoo |
| 9,170,993 B2 | 10/2015 | Kalia et al. |

(Continued)

OTHER PUBLICATIONS

Google; "Google Tasks"; <https://support.google.com/mail/answer/106237?hl=en>.

(Continued)

*Primary Examiner* — Liang Che A Wang
*Assistant Examiner* — Johnny B Aguiar
(74) *Attorney, Agent, or Firm* — L. Jeffrey Kelly

(57) ABSTRACT

Disclosed aspects relate to message management utilizing a social networking environment. A message which pertains to an anticipated activity may be detected in the social networking environment. A relevant actionable portion of the message which corresponds with the anticipated activity may be identified by analyzing the message. Using the relevant actionable portion of the message, an activity management operation for utilization to manage the anticipated activity may be determined. The activity management operation may be executed in the social networking environment for utilization to manage the anticipated activity.

16 Claims, 6 Drawing Sheets

(56) References Cited

U.S. PATENT DOCUMENTS

| | | | |
|---|---|---|---|
| 2005/0076037 A1* | 4/2005 | Shen | G06Q 10/107 |
| 2007/0073810 A1* | 3/2007 | Adams | G06Q 10/107 709/205 |
| 2009/0077027 A1* | 3/2009 | King | G06Q 10/00 |
| 2009/0235280 A1* | 9/2009 | Tannier | G06Q 10/00 719/318 |
| 2011/0106892 A1* | 5/2011 | Nelson | G06Q 10/109 709/206 |
| 2012/0245925 A1 | 9/2012 | Guha et al. | |
| 2013/0007648 A1* | 1/2013 | Gamon | G06Q 10/107 715/771 |
| 2013/0268839 A1* | 10/2013 | Lefebvre | G06F 17/21 715/234 |
| 2015/0278199 A1* | 10/2015 | Hazen | G06F 17/28 704/9 |
| 2015/0278370 A1 | 10/2015 | Stratvert et al. | |
| 2017/0091717 A1* | 3/2017 | Chandraghatgi | G06Q 10/1097 |
| 2017/0109710 A1* | 4/2017 | Gil | G06Q 10/1095 |
| 2017/0193349 A1* | 7/2017 | Jothilingam | G06N 3/006 |

OTHER PUBLICATIONS

Koplowitz, Robert; "IBM Insight 2015: Cognitive Computing and IBM Verse";<https://www.youtube.com/watch?v=kCb2j1dd9Jo>; published on Nov. 18, 2015.

* cited by examiner

US 10,397,157 B2

MESSAGE MANAGEMENT IN A SOCIAL NETWORKING ENVIRONMENT

STATEMENT REGARDING PRIOR DISCLOSURES BY THE INVENTOR OR A JOINT INVENTOR

The following disclosure(s) are submitted under 35 U.S.C. 102(b)(1)(A): IBM Insight 2015, Oct. 28, 2015.

BACKGROUND

This disclosure relates generally to computer systems and, more particularly, relates to message management in a social networking environment. Social network environments may be used to facilitate message communication between users. The amount of information communicated using social networking environments is increasing. As the amount of information communicated using social networking environments increases, the need for message management may also increase.

SUMMARY

Aspects of the disclosure relate to message management utilizing a social networking environment. Actionable items may be identified based on communication in a social networking environment. Based on the actionable items, recommended actions may be determined for the recipient of the communication. The recommended actions may be determined based on the profile information for one or more users using information regarding relationships to other recipients of the communication, job role, experience, educational background and other factors. The recommended actions may be unobtrusively presented to a recipient of the communication within the social networking environment, and candidate management operations may be suggested to the recipient to manage the recommended action.

Disclosed aspects relate to message management utilizing a social networking environment. A message which pertains to an anticipated activity may be detected in the social networking environment. A relevant actionable portion of the message which corresponds with the anticipated activity may be identified by analyzing the message. Using the relevant actionable portion of the message, an activity management operation for utilization to manage the anticipated activity may be determined. The activity management operation may be executed in the social networking environment for utilization to manage the anticipated activity.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
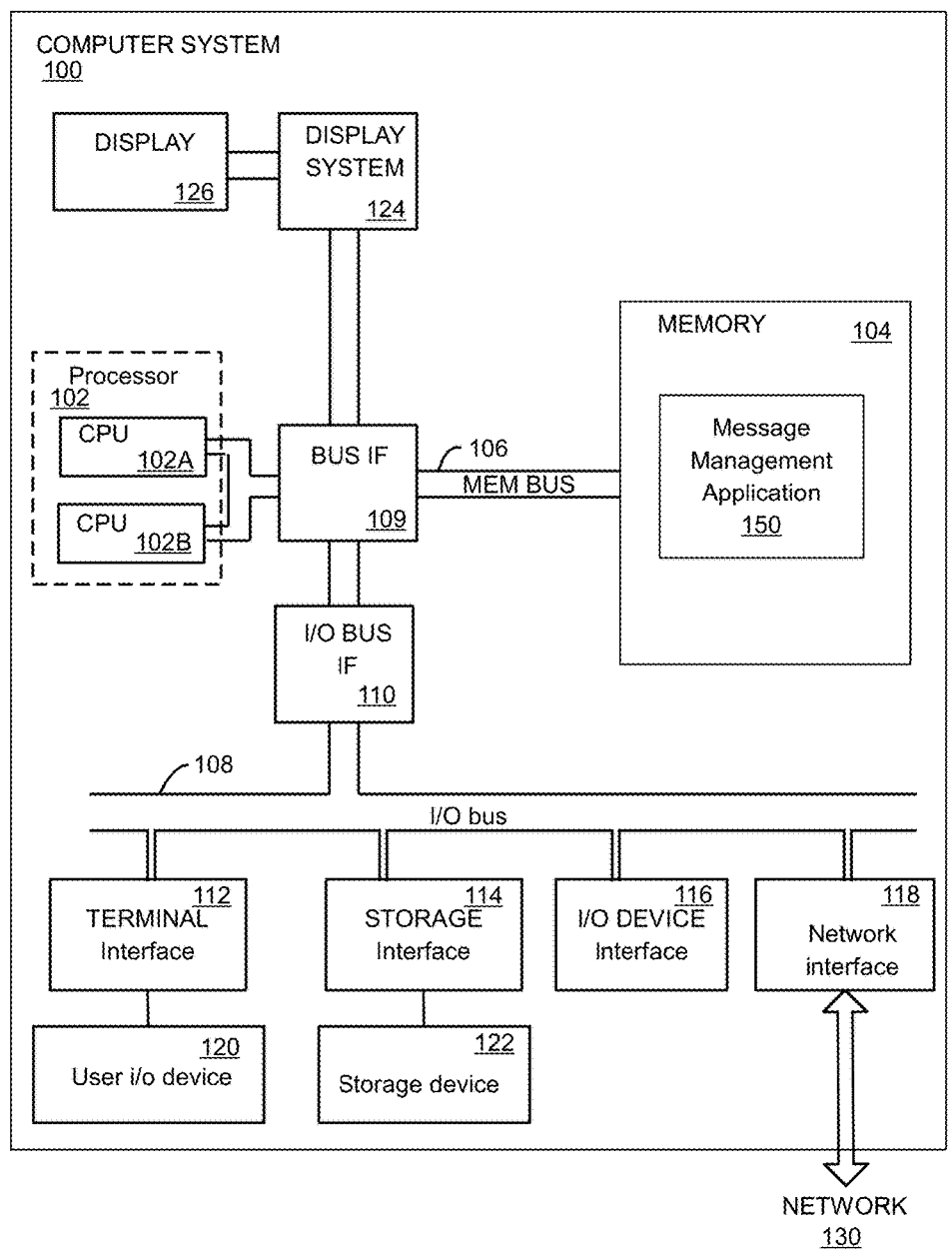
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to message management utilizing a social networking environment. Actionable items (e.g., tasks, meetings, activities) may be identified based on communication in a social networking environment. Based on the actionable items, recommended actions may be determined for the recipient of the communication. The recommended actions may be determined based on the profile information for one or more users using information regarding relationships to other recipients of the communication, job role, experience, educational background and other factors. The recommended actions may be unobtrusively presented to a recipient of the communication within the social networking environment, and candidate management operations may be suggested to the recipient to manage the recommended action. Leveraging actionable item identification in a social networking environment may be associated with content relevance, communication reliability, and action management productivity.

Online social networks are one tool for connecting people, sharing information, and promoting communication between users. Aspects of the disclosure relate to identifying tasks and relevant information in a user's communication context (e.g., work/deliverable commitments, task deadlines, requests, actions to be taken). Once identified, these items of information may be brought to the attention of users in an immediate and unobtrusive manner, allowing users to take action to resolve tasks or review information. In this way, relevant information may be surfaced within a social networking context to provide a user with options for action management. As an example, if a user receives an email from a manager requesting that he/she set up a meeting and share a recent presentation, each of these tasks may be identified and discrete tasks/relevant information for each respective task may be generated and presented to the user.

Aspects of the disclosure relate to processing a user's personal attributes including relationships to others on the communication, job role, and other factors. For example, a doctor preparing a speech about diabetes may be notified of a new study regarding diabetes such that he or she may be aware of recent information when delivering his or her speech. Aspects of the disclosure relate to arranging (e.g., prioritizing) tasks and management operations based on the nature of the event. For instance, tasks associated with urgency indicators may be prioritized over other tasks, and communications from particular individuals (e.g., managers) may be emphasized for management by users. In embodiments, aspects of the disclosure relate to suggesting candidate management operations to facilitate task completion. For example, if a user receives a request to share a quarterly results document, the system may display several files that could possibly match this request such as "QuarterlyResults.xls," "quarter.doc," "LastQuartersResults.ppt," and the like. In this way, the user may easily select from a range of possible options and share the document without having to leave their current social network environment context.

Aspects of the disclosure relate to learning and adapting to user preferences and behaviors. For instance, if a particular user rarely performs a certain task (e.g., setting up meetings), tasks related to the particular task may no longer be surfaced in the social network environment for the user. In embodiments, aspects of the disclosure relate to dynamically updating actions to reflect their current completion status. For example, consider a situation in which a User A sends an email to User B and User C asking for a meeting to be scheduled with all three users. The task of creating the meeting may be identified and brought to the attention of User B, who proceeds to set up a meeting to which Users A, B, and C are invited. After creation of the meeting, when User C opens the email, the email may include an indication that the meeting has already been created. User C may then proceed to accept the meeting invitation directly from within this context (as opposed to searching through the email inbox for the invitation).

Aspects of the disclosure relate to providing relevant actions and information to users in an unobtrusive, easy-to-view manner within the social networking environment. For instance, relevant actions and information may be displayed as a message preview (e.g., of an email, chat, or other communication). As an example, rather than using an allotted message preview space to display an abbreviated portion of the beginning of a message (Hi Mark, did you have a . . . ), the message preview space may be used to surface a relevant task (e.g., Share quarterly results with Jennifer). As another example, an action bar or other user interface may be presented to allow the user to take direct action with respect to a task.

Aspects of the disclosure relate to a system, method, and computer program product for message management utilizing a social networking environment. A message which pertains to an anticipated activity may be detected in the social networking environment. A relevant actionable portion of the message which corresponds with the anticipated activity may be identified. In embodiments, the message may be analyzed using a natural language processing technique to identify the relevant actionable portion of the message which corresponds with the anticipated activity. In embodiments, the anticipated activity may be arranged using the relevant actionable portion of the message. Using the relevant actionable portion of the message, an activity management operation for utilization to manage the anticipated activity may be determined. The activity management operation may be executed in the social networking environment for utilization to manage the anticipated activity. Altogether, aspects of the disclosure can have performance or efficiency benefits (e.g., reliability, speed, flexibility, responsiveness, stability, high availability, resource usage, productivity). Aspects may save resources such as bandwidth, disk, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a message management application 150. In embodiments, the message management application 150 may include instructions or statements that execute on the processor 102 or instructions or statements that are interpreted by instructions or statements that execute on the processor 102 to carry out the functions as further described below. In certain embodiments, the message management application 150 is implemented in hardware via semiconductor devices, chips, logical gates, circuits, circuit cards, and/or other physical hardware devices in lieu of, or in addition to, a processor-based system. In embodiments, the message management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
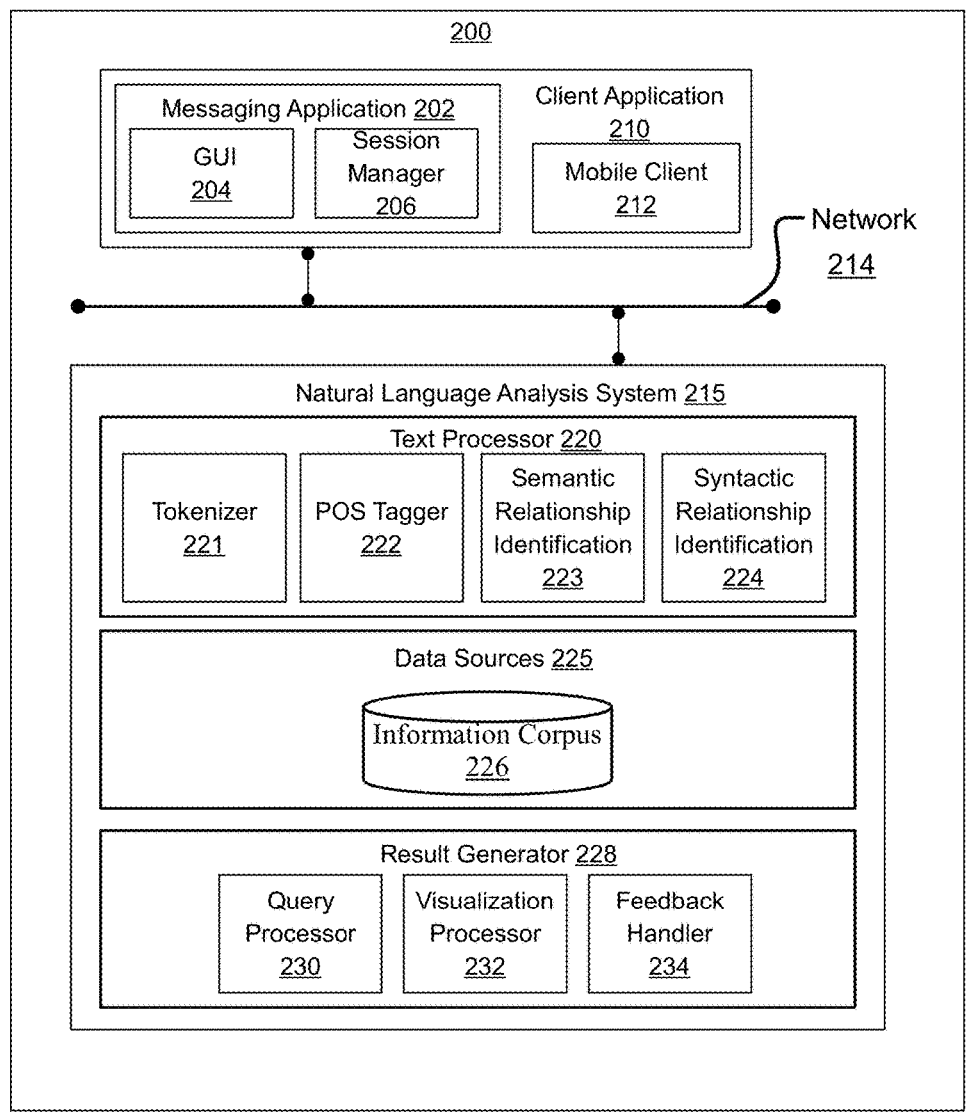
FIG. 2 is a block diagram illustrating an architecture for natural language analysis, according to embodiments.

FIG. 2 is a block diagram illustrating an architecture 200 for natural language analysis, according to embodiments. Aspects of FIG. 2 relate to performing one or more natural language processing and textual analytics operations to evaluate and interpret natural language elements (e.g., textual data, speech). In embodiments, natural language data may be collected from one or more remote devices (e.g., smartphones, tablets, laptop/desktop computers, other computing devices) by a natural language analysis system 215. The natural language analysis system 215 can perform methods and techniques for processing and interpreting the natural language data collected from the remote devices. Client applications 210 may involve one or more entities operable to generate events dispatched to natural language analysis system 215 via network 214. In certain embodiments, the events received at natural language analysis system 215 may correspond to electronic messages received from users, where the electronic messages may be expressed in a free form and in natural language.

An electronic message may include one or more words that form a phrase, sentence, paragraph, or other composition. The electronic message may include textual data, image data, video data, audio data, or other types of electronic media. Electronic messages may be composed of linguistic features including parts-of-speech, verb tenses, lexical categories, conjugations, punctuation, contractions, sentence types, and the like. In certain embodiments, the electronic message may include both restricted and unrestricted syntax for natural language expression.

In embodiments, client applications 210 can include one or more components such as a messaging application 202 and a mobile client 212. Client applications 210 can operate on a variety of devices. Such devices may include mobile and handheld devices, laptops, mobile phones, personal or enterprise digital assistants, personal computers, servers, or other computer systems configured to access the services and functionality provided by natural language analysis system 215. For example, mobile client 212 may include an application installed on a mobile or other handheld device. In embodiments, mobile client 212 may transmit electronic messages to natural language analysis system 215.

In embodiments, messaging application 202 can facilitate the composition and transmission of electronic messages to natural language analysis system 215. In certain embodiments, messaging application 202 can include a client application with respect to the natural language analysis system 215. In embodiments, messaging application 202 can transmit user-composed messages to natural language analysis system 215 for processing. Messaging application 202 may be installed on a personal computer, mobile device, server or other computer system. In certain embodiments, messaging application 202 can include a graphical user interface (GUI) 204 and session manager 206. Users may input electronic message text in GUI 204. In certain embodiments, GUI 204 may include a message composition window or other interface component to receive the input of natural language data. Users may authenticate to natural language analysis system 215 via session manager 206. In certain embodiments, session manager 206 may keep track of user activity across sessions of interaction with the natural language analysis system 215. Session manager 206 may keep track of the electronic messages that are submitted within the lifecycle of a session of a user. For example, session manager 206 may retain a succession of messages submitted by a user during a session. Information for sessions managed by session manager 206 may be shared between computer systems and devices.

In embodiments, client applications 210 and natural language analysis system 215 can be communicatively coupled through network 214 (e.g. the Internet, intranet, or other public or private computer network). In certain embodiments, natural language analysis system 215 and client applications 210 may communicate by using Hypertext Transfer Protocol (HTTP) or Representational State Transfer (REST) calls. In certain embodiments, natural language analysis system 215 may reside on a server node. Client applications 210 may establish server-client communication with natural language analysis system 215 or vice versa. In certain embodiments, the network 214 can be implemented within a cloud computing environment, or using one or more cloud computing services. Consistent with various embodiments, a cloud computing environment can include a network-based, distributed data processing system that provides one or more cloud computing services.

Consistent with various embodiments, natural language analysis system 215 may be configured to process and analyze the natural language included in electronic messages received from client applications 210. In certain embodiments, natural language analysis system 215 may include a text processor 220, data sources 225, and result generator 228. Text processor 220 can include a computer module that analyzes the received electronic messages. In certain embodiments, text processor 220 can perform various methods and techniques for analyzing the electronic messages syntactically and semantically. Text processor 220 may include various modules to perform analyses of received electronic messages. For example, text processor 220 may include a tokenizer 221, a part-of-speech (POS) tagger 222, semantic relationship identification 223, and syntactic relationship identification 224.

Consistent with various embodiments, tokenizer 221 may include a computer module that performs lexical analysis. Tokenizer 221 can convert a sequence of characters into a sequence of tokens. Tokens may include strings of characters typed by a user and categorized as a meaningful symbol. Further, in certain embodiments, tokenizer 221 can identify word boundaries in an electronic message and break sentences into their component parts such as words, multi-word tokens, numbers, and punctuation marks. In certain embodiments, tokenizer 221 can receive a string of characters, identify the lexemes in the string, and categorize them into tokens.

Consistent with various embodiments, POS tagger 222 can include a computer module that marks up a word in a text to correspond to a particular part of speech. POS tagger 222 can read a sentence or other text in natural language and assign a part of speech to each word or other token. POS tagger 222 can determine the part of speech to which a word corresponds based on the definition of the word and the context of the word. The context of a word may be based on its relationship with adjacent and related words in a phrase, sentence, question, or paragraph. In certain embodiments, the context of a word may be dependent on one or more previously received electronic messages. Examples of parts of speech that may be assigned to words include, but are not limited to, nouns, verbs, adjectives, adverbs, and the like. Examples of other part of speech categories that POS tagger 222 may assign include, but are not limited to, comparative or superlative adverbs, wh-adverbs, conjunctions, determiners, negative particles, possessive markers, prepositions, wh-pronouns, and the like. In certain embodiments, POS tagger 222 can tag or otherwise annotate tokens of a question with part of speech categories. In certain embodiments, POS tagger 222 can tag tokens or words of an electronic message to be parsed by other modules of natural language analysis system 215.

In embodiments, semantic relationship identification 223 may include a computer module that can identify semantic relationships of recognized entities in electronic messages composed by users. In certain embodiments, semantic relationship identification 223 may determine functional dependencies between entities, the dimension associated with a member, and other semantic relationships.

In embodiments, syntactic relationship identification 224 may include a computer module that can identify syntactic relationships in electronic messages composed of tokens posed by users to natural language analysis system 215. Syntactic relationship identification 224 can determine the grammatical structure of sentences, such as which groups of words are associated as "phrases" and which word is the subject or object of a verb. In certain embodiments, syntactic relationship identification 224 can conform to a formal grammar.

In embodiments, text processor 220 may include a computer module that can parse a received electronic message and generate a corresponding data structure for the message. For example, in response to receiving an electronic message at natural language analysis system 215, text processor 220 can output the parsed message as a data structure. In certain embodiments, the parsed question may be represented in the form of a parse tree or other graph structure. To generate the parsed message, text processor 220 may trigger computer modules 221-224. Text processor 220 can use functionality provided by computer modules 221-224 individually or in combination. Additionally, in certain embodiments, text processor 220 may use external computer systems for dedicated tasks that are part of the message parsing process.

In embodiments, the output of text processor 220 can be used by natural language analysis system 215 to associate content of the electronic message with data maintained in one or more data sources 225. In embodiments, data sources 225 may include data warehouses, information corpora, data models, and document repositories. In certain embodiments, the data sources 225 may include an information corpus 226. The information corpus 226 can enable data storage and retrieval. In certain embodiments, the information corpus 226 may include a storage mechanism that houses a standardized, consistent, clean and integrated form of data. The data may be sourced from various operational systems. Data stored in the information corpus 226 may be structured in a way to specifically address reporting and analytic requirements. In one embodiment, the information corpus 226 may include a relational database (e.g., conform to an ontology). In some example embodiments, data sources 225 may include one or more document repositories.

In certain embodiments, result generator 228 may include a computer module that generates output data structures for received electronic messages. For instance, the result generator 228 may be configured to generate associated evaluations and prioritization arrangements for one or more portions of the electronic message. Other types of results are also possible.

In embodiments, result generator 228 may include query processor 230, visualization processor 232 and feedback handler 234. When information in a data source 225 is coupled with an electronic message, a query associated with the requested data can be executed by query processor 230 to retrieve the data from the data source 225. Using the data retrieved by query processor 230, visualization processor 232 can render visualization of the retrieved data, where the visualization represents the retrieved data. In certain embodiments, visualization processor 232 may render various analytics to represent the data including, but not limited to, images, emoticons, charts, tables, dashboards, maps, and the like. In certain embodiments, visualization processor 232 can present the data to a user in understandable form.

In certain embodiments, feedback handler 234 can include a computer module that processes feedback from users on electronic messages processed by natural language analysis system 215. In certain embodiments, users may be engaged in dialog with the natural language analysis system 215 to evaluate the relevance, efficacy, or performance of processed messages. Result generator 228 may produce a list of candidate message results for a processed electronic message. The user may rank each answer according to its relevance, efficacy, performance, or quality. In certain embodiments, the feedback of users on processed messages may be used for future message processing sessions.

Figure 3:
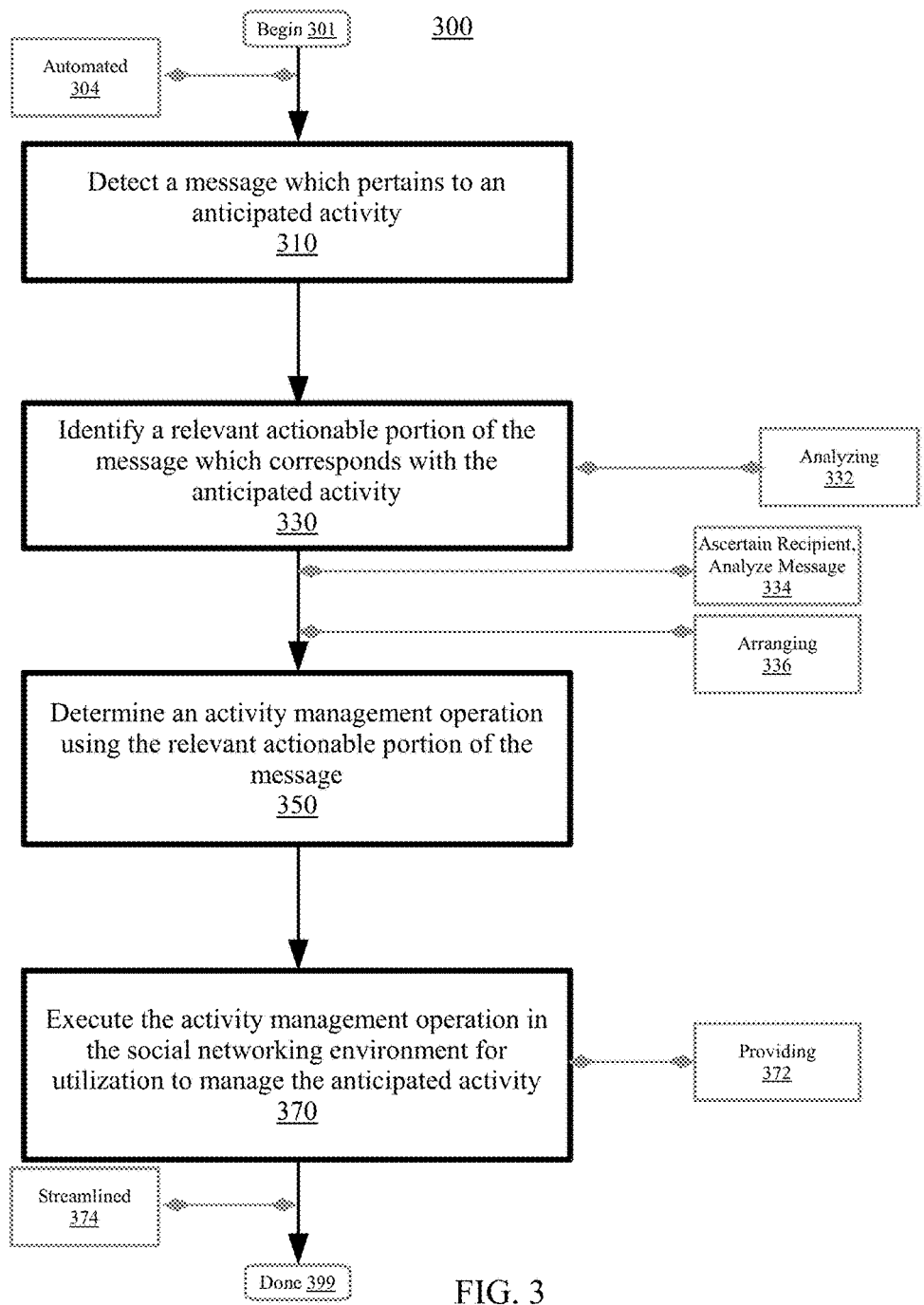
FIG. 3 is a flowchart illustrating a method for message management utilizing a social networking environment.

FIG. 3 is a flowchart illustrating a method 300 for message management utilizing a social networking environment. Aspects of FIG. 3 relate to managing actionable items (e.g., anticipated activities, relevant actionable portions) of a message in a social networking environment. Aspects of the disclosure relate to the recognition that, in some situations, the elements of a communication (e.g., tasks, requests, information) that are relevant to a particular user may not be clear, apparent, or evident within a message. Accordingly, aspects of the disclosure relate to identifying relevant actionable portions of a message that correspond to an anticipated activity (e.g., based on profile data for a user), and providing one or more activity management operations to facilitate resolution of an action by a user of the social networking environment. Generally, social networking environments can include platforms that offer communication tools to facilitate the sharing of messages, information, ideas, pictures, videos, and other data between a community of users. As examples, social networking environments may include one or more of instant messaging platforms (e.g., chat service), short messaging services (e.g., text messaging), wiki databases (e.g., user maintained digital encyclopedia), social communities (e.g., micro-blog, professional connections, photo-sharing, other groups of users), newsfeeds (e.g., interface for reception and display news events and activity data), email platforms (e.g., internet or other network-based messaging tool), calendars (e.g., shared calendar platform), product reviews (e.g., collection of user reviews), project collaborations (e.g., group of users working together on a task), or the like. Leveraging actionable item identification in a social networking environment may be associated with content relevance, communication reliability, and action management productivity. The method 300 may begin at block 301.

In embodiments, the detecting, the identifying, the determining, the executing, and other steps described herein may each occur in an automated fashion without user intervention at block 304. In embodiments, the detecting, the identifying, the determining, the executing, and other steps described herein may be carried out by an internal message management module maintained in a persistent storage device of a local computing device (e.g., computing device of a user). In certain embodiments, the detecting, the identifying, the determining, the executing, and other steps described herein may be carried out by an external message management module hosted by a remote computing device or server (e.g., social network environment accessible via a subscription, usage-based, or other service model). In this way, aspects of message management may be performed using automated computing machinery without manual action. Other methods of performing the steps described herein are also possible.

At block 310, a message which pertains to an anticipated activity may be detected in a social networking environment. Generally, detecting can include sensing, recognizing, discovering, or ascertaining the message which pertains to the anticipated activity. The message can include emails, text (e.g., SMS) messages, chat messages, social network comments/posts, or private exchanges between individuals, or other types of communication. In embodiments, the message may pertain to an anticipated activity. The anticipated activity can include an event, occurrence, plan, gathering, function, or other action that is expected, predicted, planned, or forecasted to occur in the future. For instance, the anticipated activity may include a meeting, conference, presentation, project, speech/address, or other future event. As described herein, the message relating to the anticipated activity may be detected in the social networking environment. In embodiments, detecting may include receiving a communication (e.g., email) from a sender, and performing an initial content verification to determine that the message pertains to an anticipated activity. As an example, a first user may receive an email from a second user using an email management program. The email may be scanned (e.g., using one or more content analysis techniques), and it may be determined that the email relates to a meeting between the first user, the second user, and one or more other users at a specified time and date. Accordingly, the meeting may be recognized as an anticipated activity, and the message may be detected to pertain to an anticipated activity. Other methods of detecting the message pertaining to an anticipated activity are also possible.

At block 330, a relevant actionable portion of the message which corresponds with the anticipated activity may be identified. Generally, identifying can include recognizing, discovering, sensing, finding, extracting, or otherwise ascertaining the relevant actionable portion of the message which corresponds with the anticipated activity. The relevant actionable portion of the message may include an aspect of the communication that indicates a specific action, deed, or performance associated with the anticipated activity. For instance, the relevant actionable portion of the message may include a task or request to be performed with respect to the anticipated activity. As examples, the relevant actionable portion of the message may include actions related to sending meeting invites to users to set up a meeting, sharing a file on a public file-sharing system, drafting a message, creating a presentation, contacting an individual, reviewing a document, or other type of activity. In embodiments, the relevant actionable portion which corresponds to the anticipated activity may be identified from a message in a social networking environment. Identifying the relevant actionable portion may include parsing the content of a message, and determining a particular task, instruction, or directive. As an example, the content of a message may be parsed (e.g., using a natural language processing technique), and a sentence of "Please prepare the product introduction presentation for Wednesday's product showcase," may be extracted. Accordingly, the phrase "Prepare the product introduction presentation" may be identified as the relevant actionable portion of the message (e.g., corresponding with an anticipated activity of "product showcase"). Other methods of identifying the relevant actionable portion of the message which corresponds with the anticipated activity are also possible.

In embodiments, the message may be analyzed using a natural language processing technique to identify the relevant actionable portion of the message which corresponds with the anticipated activity at block 332. Generally, analyzing can include examining (e.g., performing an inspection of the message), evaluating (e.g., generating an appraisal of the message), resolving (e.g., ascertaining an observation/conclusion/answer with respect to the message), parsing (e.g., deciphering structured and unstructured data constructs of the message), querying (e.g., asking a question regarding the message) or categorizing (e.g., organizing by a feature or element of the message). The natural language processing technique may include an algorithm configured to parse the semantic and syntactic content (e.g., of a message) to draw conclusions, ascertain features, extract information, and derive meaning from natural language. As examples, the natural language processing technique may include one or more of part-of-speech-tagging, relationship extraction, natural language understanding, named entity recognition, automatic summarization, coreference resolution, word sense disambiguation, or other techniques. In embodiments, the natural language processing technique may be configured to identify subjects, objects, verbs, and temporal features of the message in order to determine the relevant actionable portion of the message which corresponds with the anticipated activity. As an example, the natural language processing technique may ascertain a subject of "Rodney," an object of "script," a verb of "prepare," and a timeline of "July 25th" from a message, and analyze the context of the message to synthesize a relevant actionable portion of "Rodney, prepare the script by July 25th," for the message. Other methods of analyzing the message using a natural language processing technique to identify the relevant actionable portion are also possible.

In embodiments, an intended recipient user may be ascertained, and the relevant actionable portion of the message may be identified by comparing the message and a set of user profile data for the intended recipient user at block 334. Aspects of the disclosure relate to the recognition that, in some situations, background information for users may be used to determine particular actionable portions of a message that are specifically relevant to certain users. Generally, ascertaining can include sensing, detecting, distinguishing, recognizing, or otherwise determining the intended recipient user of a message. The intended recipient user may include one or more individuals who are selected, marked, or targeted for receiving the message in the social networking environment. In embodiments, ascertaining the intended recipient of the message may include analyzing a recipient field (e.g., "To:") of a message, and extracting the name or names of one or more individuals or organizations. In embodiments, the message may be analyzed by comparing the message and a set of user profile data for the intended recipient user to identify the relevant actionable portion of the message. Generally, analyzing can include evaluating, inspecting, contrasting, or juxtaposing the message and the set of user profile data for the intended recipient user. The set of user profile data may include background information regarding the work experience, educational experience, job role, relationship to other users, interests, and other factors pertaining to the intended recipient user. As described herein, the set of user profile data for the intended recipient user may be compared with the message in order to ascertain actionable portions of the message that are particularly relevant to the intended recipient user. For instance, in embodiments, a natural language processing technique may be configured to examine the set of user profile data with respect to the content of the message, and ascertain one or more relevant actionable portions that achieve a relevance threshold (e.g., substantial similarity of semantic/syntactic content) with respect to the intended recipient user. As an example, for an intended recipient user associated with a set of user profile data indicating a job role of "Lawyer," an actionable item of "Review the merger contract" may be identified as a relevant actionable portion of the message for the intended recipient user (e.g., the user profile data indicated a similarity between the job role of the intended recipient user and the nature of the task). Other methods of ascertaining an intended recipient user and analyzing the message to identify the relevant actionable portion are also possible.

In embodiments, the anticipated activity may be arranged using the relevant actionable portion of the message at block 336. Aspects of the disclosure relate to the recognition that, in some situations, a plurality of anticipated activities may be associated with a message or set of messages, where each anticipated activity has different requirements, challenges, and timelines. Accordingly, aspects of the disclosure relate to arranging one or more anticipated activities using the relevant actionable portion to facilitate activity management. Generally, arranging can include organizing, systematizing, weighting, or formatting one or more anticipated activities using the relevant actionable portion. In embodiments, arranging may include prioritizing one or more anticipated activities based on the relevant actionable portion. As an example, anticipated activities having timelines that achieve an urgency threshold (e.g., early deadline, short time between notification and desired completion date), are received from specified individuals (e.g., managers, clients, spouses), relate to specific tasks (e.g., high importance tasks), or achieve other criteria may be marked for expedited completion, emphasized for attention, or otherwise prioritized. In embodiments, arranging may include calculating and assigning weighting values to one or more anticipated activities (e.g., weight of 88 for a first anticipated activity), creating a schedule/updating a calendar, allotting resources (e.g., time, workers) to anticipated activities, constructing a timeline of upcoming anticipated activities, or the like. Other methods of arranging the anticipated activity are also possible.

At block 350, an activity management operation for utilization to manage the anticipated activity may be determined using the relevant actionable portion of the message. Generally, determining can include computing, formulating, identifying, generating, deriving, or otherwise ascertaining the activity management operation for utilization to manage the anticipated activity. The activity management operation may include an action, process, procedure, or other function configured to resolve, handle, execute, administer, or otherwise manage the anticipated activity. In embodiments, the activity management operation may include a recommended user action to handle the anticipated activity. For instance, for an anticipated activity of an upcoming gathering between different users, the activity management operation may include an option to create a meeting (e.g., reserve a conference room, transmit invites to users, select a time and date for the meeting). As another example, for an anticipated activity of a wedding, the activity management operation may include suggestions to calculate a budget, generate a guest list, book a photographer (e.g., via an online reservation system), or the like. As described herein, the activity management operation may be determined using the relevant actionable portion of the message. In embodiments, determining may include using natural language content included in the relevant actionable portion of the message to ascertain one or more predetermined activity management operations from a list of possible operations based on semantic similarity between the activity management operation and the relevant actionable portion of the message.

Consider the following example. A relevant actionable portion for a message of "Send the draft contract to the client for review" may be identified with respect to an anticipated activity of "business meeting." Accordingly, the relevant actionable portion of the message may be compared with respect to a list of possible operations including "Draft a message," "Set-up a meeting," "Transmit a file," "Calculate a result," "Verify contents," "Contact a person," and "Open a program." Based on the comparison between the relevant actionable portion of the message and the list of possible operations, a relevance factor (e.g., integer value between 0 and 100, where greater values indicate greater relevance) may be calculated for each possible operation with respect to the content of the relevant actionable portion of the message. As examples, the possible operation of "Draft a message" may be assigned a relevance factor of 62, the possible operation of "Set-up a meeting" may be assigned a relevance factor of 39, the possible operation of "Transmit a file" may be assigned a relevance factor of 94, and the possible operation of "Calculate a result" may be assigned a relevance factor of 11. In embodiments, the possible operation having the greatest relative relevance factor may be determined as the activity management operation. Accordingly, the operation of "Transmit a file" may be determined as the activity management operation (e.g., semantic similarity between "Send" and "Transmit" may indicate substantial relevance). Other methods of determining the activity management operation using the relevant actionable portion of the message are also possible.

At block 370, the activity management operation may be executed in the social networking environment for utilization to manage the anticipated activity. As described herein, aspects of the disclosure relate to using the activity management operation to facilitate handling, management, or resolution of the anticipated activity. Generally, executing can include processing, delivering, carrying-out, instantiating, or otherwise performing the activity management operation in the social networking environment. In embodiments, executing the activity management operation may include initiating performance of the activity management operation. For instance, for an activity management operation of "Send a file," a particular file may be uploaded (e.g., attached to a communication) to the social networking environment and transmitted to a recipient user. As an example, consider an anticipated activity of "Budget Meeting" for which an activity management operation of "Generate a budget" has been determined (e.g., based on a relevant actionable portion of a message stating "Prepare budget materials"). The social networking environment may be configured to receive a set of expense items together with respective currency values, organize the received data (e.g., as a spreadsheet, bar graph, pie chart), and perform calculations to compute surpluses and deficits. In this way, the activity management operation may be executed to facilitate management of the anticipated activity. Other methods of executing the activity management operation in the social networking environment to manage the anticipated activity are also possible.

In embodiments, a candidate user action may be provided in the social networking environment to a user at block 372. Generally, providing can include displaying, delivering, conveying, relaying, sending, or otherwise presenting a candidate user action to a user of the social networking environment. The candidate user action may include a recommended action for a user to facilitate management of the anticipated activity. In embodiments, the candidate user action may present a plurality of possible options to a user that may be used to manage the anticipated activity. In embodiments, providing may include displaying a pop-up window, dialogue box, or other graphical user interface element within the social networking environment to suggest the candidate user action to the user. As an example, consider an anticipated activity of a "business meeting with client" that is associated with a relevant actionable portion of "Send sales presentation to Timothy for review." An activity management operation of "Transmit a file" may be determined with respect to the anticipated activity. Accordingly, a candidate user action may be provided in the social networking environment that recommends that the user upload the sales presentation. A dialogue box may be displayed to the user, such that the user may select the sales presentation for upload and transmission to the mentioned user of "Timothy." In certain embodiments, in response to providing the candidate user action, a user action (e.g., action taken by the user to perform/manage the candidate user action) may be received (e.g., detected, collected, captured). Other methods of providing the candidate user action in the social networking environment are also possible.

Consider the following example. A message may be sent by a team leader, John to three other users George, Paul, and Ringo. The message may include the following content:

"We're going to need to put a draft project proposal together by this Friday. The sales trajectory presentation will need to be done by Wednesday night at the latest for me to review. I'm not sure what the copyright status is on the proposed logo, so I'd like an analysis of that as well. In order to convince these guys, we're going to need lots of technical details, so a detailed explanation of the hardware design and architecture of the product will also be necessary. Thanks for your help!"

As described herein, the content of the message may be analyzed using a natural language processing technique, and it may be ascertained that the message relates to an anticipated activity of "project proposal." The natural language analysis may also indicate relevant actionable portions of "[Finish] sales trajectory presentation . . . by Wednesday night," "[Analyze] copyright status of proposed logo " and "[Explain] the hardware design and architecture." In embodiments, the relevant actionable portions of the message may be compared to user profile data for the recipients of the message, (e.g., Paul, George, and Ringo, respectively). In response to the comparison, it may be determined that the relevant actionable portion related to the sales presentation corresponds to Paul (e.g., the set of user profile data for Paul indicates a job role of "Sales and Marketing"), the relevant actionable portion related to the copyright status may be determined to correspond to George (e.g., the set of user profile data for George indicates a job role of "Legal Counsel") and the relevant actionable portion related to the hardware design may be determined to correspond to Ringo (e.g., the set of user profile data for Ringo indicates a job role of "Senior Engineer"). Accordingly, as described herein, an activity management operation may be determined for one or more recipients of the message. For instance, an activity management operation of "Edit Presentation Materials" may be determined and provided to Paul (e.g., to create/modify the sales presentation), an activity management operation of "Access Copyright Database" may be determined and provided to George (e.g., for use in analyzing the copyright status of the logo), and an activity management operation of "Open Design Specification" may be determined and provided to Ringo (e.g., for aid in explaining the hardware design). As described herein, the activity management operations may be provided to the respective recipients of the message, and executed in the social media environment. Other methods of using activity management operations to manage the anticipated activity are also possible.

In embodiments, the detecting, the identifying, the determining, the executing, and other steps described herein may each occur in a dynamic fashion to streamline message management at block 374. For instance, the detecting, the identifying, the determining, the executing, and other steps described herein may occur in real-time, ongoing, or on-the-fly. As an example, one or more steps described herein may be performed simultaneously (e.g., identifying the actionable portion of the message may be performed at the same time as ascertaining an intended recipient user of the message) in order to streamline (e.g., facilitate, promote, enhance) message management.

Method 300 concludes at block 399. As described herein, aspects of method 300 relate to message management utilizing a social networking environment. Aspects of method 300 may provide performance or efficiency benefits for content relevance. As an example, dynamically providing an indication of a relevant actionable portion of a message as well as an activity management operation may provide users an easier way to manage tasks and events. For instants, users may be able to quickly identify which tasks and activities are relevant to them, and utilize the activity management operation to facilitate resolution and management of those tasks. Altogether, leveraging actionable item identification in a social networking environment may be associated with content relevance, communication reliability, and action management productivity.

Figure 4:
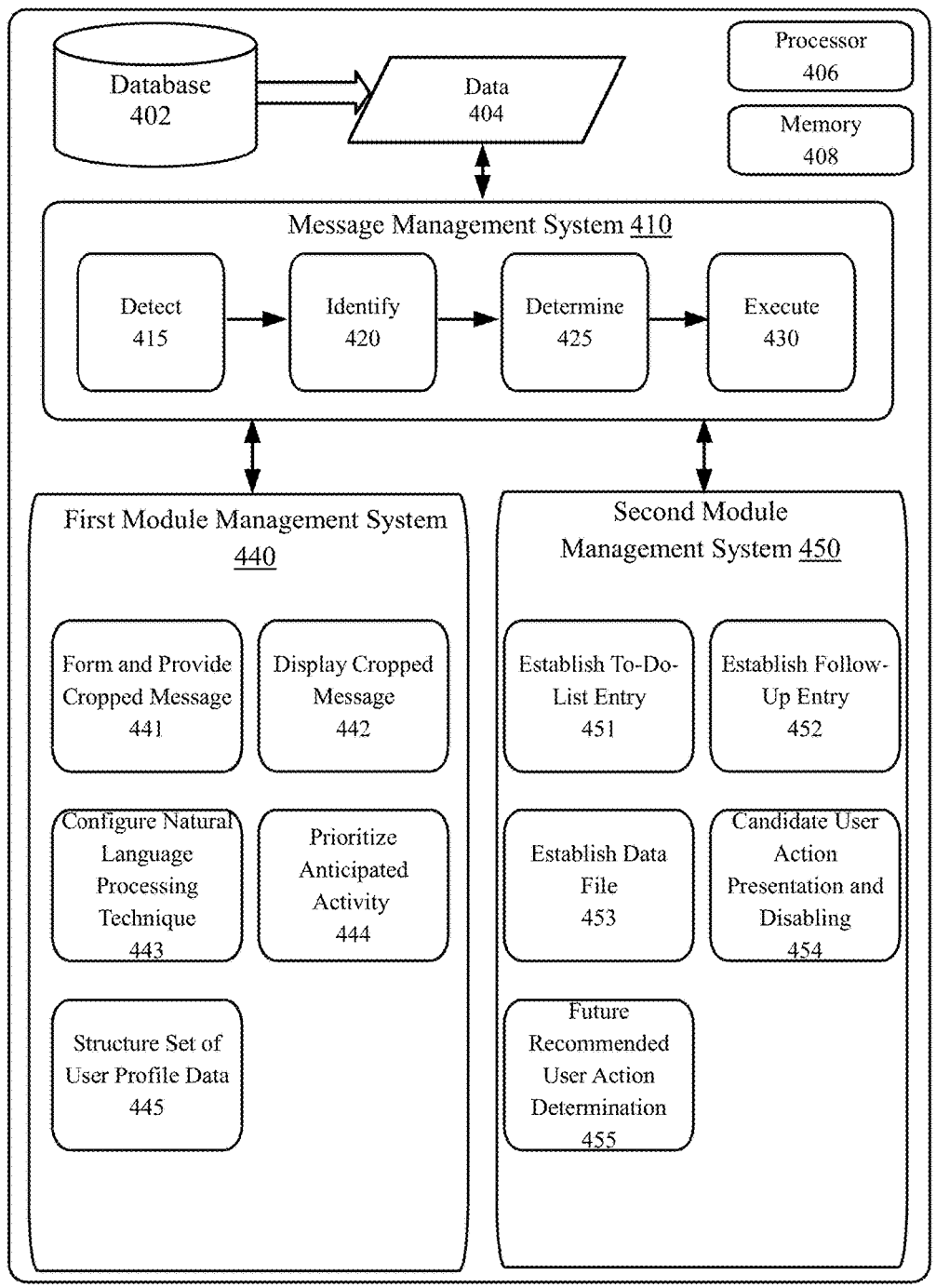
FIG. 4 shows an example system for message management utilizing a social networking environment, according to embodiments.

FIG. 4 shows an example system 400 for message management utilizing a social networking environment, according to embodiments. Aspects of FIG. 4 relate to identifying relevant actionable portions (e.g., tasks, meetings, activities) corresponding to anticipated activities based on messages in a social networking environment, and determining activity management operations to manage the anticipated activities. The example system 400 may include a processor 406 and a memory 408 to facilitate implementation of message management. The example system 400 may include a database 402 (e.g., social networking database) configured to maintain data used for message management (e.g., message data, activity management operation index). In embodiments, the example system 400 may include a message management system 410. The message management system 410 may be communicatively connected to the database 402, and be configured to receive data 404 (e.g., messages, activity management operations) related to message management. The message management system 410 may include a detecting module 415 to detect a message which pertains to an anticipated activity, an identifying module 420 to identify a relevant actionable portion of the message, a determining module 425 to determine an activity management operation, and an executing module 430 to execute the activity management operation in the social networking environment. The message management system 410 may be communicatively connected with a first module management system 440 and a second module management system 450 that each include a set of modules for implementing aspects of message management.

In embodiments, a cropped message may be formed and provided at module 441. As described herein, aspects of the disclosure relate to presenting relevant portions of a message to a user. Accordingly, in embodiments, the message may be cropped to emphasize the portions of message content that are particularly relevant to a user. Generally, forming can include editing, adjusting, generating, modifying, organizing, revising, or otherwise creating the cropped message. The cropped message may include a trimmed, truncated, condensed, summarized, or otherwise abbreviated version of the message. In embodiments, forming may include filtering out portions of the message that fail to achieve a relevance factor (e.g., greetings, superfluous language), and selecting portions of the message that achieve a relevance factor for inclusion in the cropped message. In embodiments, forming may include selecting the relevant actionable portion identified for a particular user (e.g., based on user profile data) together with context relevant details for inclusion in the cropped message. In certain embodiments, the cropped message may include a summary of the relevant actionable portion as well as other context relevant information identified by the natural language processing technique. In embodiments, the cropped message may be provided to the user in the social networking environment. Generally, providing can include displaying, transmitting, sending, or otherwise presenting the cropped message to the user. In embodiments, providing the cropped message may include presenting the cropped message as a message preview. For instance, the cropped message may be displayed in a message header space so as to be readily visible to a user of the social networking environment. Other methods of forming and providing the cropped message are also possible.

In embodiments, the relevant actionable portion may be displayed without increasing a display space allotted to the message at module 442. The relevant actionable portion may be displayed to provide the cropped message to the user in the social networking environment. Generally, displaying can include conveying, relaying, exhibiting, presenting, or otherwise visually representing the relevant actionable portion. Aspects of the disclosure relate to the recognition that, in some situations, the display space available for message presentation in a social networking environment may be limited. Accordingly, aspects of the disclosure relate to displaying the relevant actionable portion in the social networking environment without increasing the display space allotted to the message. In embodiments, displaying may include providing a cropped message that only includes the relevant actionable portion of the message. In embodiments, displaying may include ascertaining the number of characters that may be displayed in the display space allotted to the message (e.g., 100 characters) and cropping the message down to the words or phrases associated with the highest relevance factors that will fit in the allotted display space. In embodiments, displaying may include ascertaining a set of linguistic features including a subject, object, verb, and timeframe element from the relevant actionable portion of the message, and displaying the ascertained linguistic features in the display space for the message (e.g., Gerry-Send-Presentation-Friday). Other methods of displaying the relevant actionable portion of the message without increasing the display space allotted to the message are also possible.

In embodiments, the natural language processing technique may be configured to parse a set of features at module 443. As described herein, aspects of the disclosure relate to utilizing a natural language processing technique to perform analysis techniques on the content of a message in a social networking environment. Accordingly, in embodiments, the natural language processing technique may be configured (e.g., adapted, set-up, programmed, trained) to parse particular linguistic features of the message (e.g., to facilitate identification of the relevant actionable portion of the message). In embodiments, the natural language processing technique may be configured to parse an action-oriented feature. The action oriented feature may include a verb, predicate, or other linguistic element that functions to express an action, state, or relation. As examples, the action-oriented feature may include words such as "Transmit," "Review," "Execute," "Prepare," and the like. In embodiments, the natural language processing technique may be configured to parse a user-oriented feature. The user-oriented feature may include an aspect of the message that relates to an individual, user of the social networking environment, group, organization, or the like. As examples, the user-oriented feature may include the name of an individual or organization (e.g., James, ACME Corporation), location of a user (e.g., Building 14, Conference Room 112), status information of a user (e.g., busy, away, available), or background information for a user (e.g., work experience, educational experience). In embodiments, the natural language processing technique may include a temporal-oriented feature. The temporal-oriented feature may include an aspect of the message that relates to time (e.g, past, present, feature), sequential relations (e.g., of events), or durations. As examples, the temporal-oriented feature may include a date (e.g., March 22nd), day of the week (e.g., Thursday), time of day (e.g., 11:30 AM) deadline (e.g., by August 30th) a time frame (e.g., between the 12th and 14th), scheduled event (e.g., every Tuesday at 10:00 AM) or the like. As described herein, the natural language processing technique may be configured to detect the set of features within a message, ascertain relevant context for each feature, and leverage this information to identify the relevant actionable portion of the message. Other methods of configuring the natural language processing technique are also possible.

In embodiments, the anticipated activity may be prioritized based on a set of elements of the relevant actionable portion of the message at module 444. Aspects of the disclosure relate to the recognition that, in some situations, particular anticipated activities may be associated with different priorities (e.g., importance, relevance, significance) based on the nature of the activity. Accordingly, aspects of the disclosure relate to using a set of elements to prioritize an anticipated activity (e.g., with respect to other anticipated activities). Generally, prioritizing may include emphasizing, weighting, highlighting, arranging, or otherwise assigning an order or precedence to the anticipated activity based on the set of elements. In embodiments, the set of elements may include an indicated task-type. The indicated task-type may include the nature, kind, category, purpose, or function of a particular task, assignment, or operation referenced in the message. As examples, the indicated task-type may include transferring a file, scheduling a meeting, reviewing a draft, contacting a user, preparing materials, or the like. In embodiments, the set of elements may include an indicated urgency. The indicated urgency may include the seriousness, time-pressure, criticality, or necessity of a particular anticipated activity. As examples, an activity with an early deadline (e.g., that achieves an urgency threshold), a request for expediency, or directions for immediate management (e.g., by a sender of the message) may be determined to be associated with an indicated urgency. In embodiments, the set of elements may include a set of indicated users. The set of indicated users may include a list, index, or other record of the individuals associated with a particular anticipated activity. As an example, an anticipated activity associated with one or more individuals having an organizational hierarchy status above a threshold level (e.g., managers, company presidents, project leads) may be prioritized with respect to anticipated activities associated with individuals of lower organizational hierarchy status. As described herein, the set of elements may be examined and weighted to determine a prioritization (e.g., order of importance) for an anticipated activity with respect to other anticipated activities. Other methods of prioritizing the anticipated activity based on a set of elements are also possible.

In embodiments, the set of user profile data for the intended recipient user may be structured to include a relationship of the intended recipient user with respect to a set of other users indicated in the message at module 445. The set of user profile data may be structured (e.g., organized, formatted, arranged, assembled, generated) to include an indication of one or more profile data elements. In embodiments, the set of user profile data may include a relational user history. The relational user history may include an archive of events, projects, tasks, jobs, and organizations with which a user has been involved (e.g., user was with Company A for 8 years, Company B for 12 years). In embodiments, the set of user profile data may include a relational user background. The relational user background may include a description of qualifications, work experience, or educational experience (e.g., Masters degree in Software Engineering). In embodiments, the set of user profile data may include a relational user role. The relational user role may include a job role, job title, or other position within an organization (e.g., Accountant, Designer). In embodiments, the set of user profile data may include a relational user function. The relational user function may include the specific tasks or activities (e.g., area of focus) performed by a user within their job role (e.g., User Interface Design). In embodiments, the set of user profile data may include a relational user skill. The relational user skill may include an ability, qualification, talent, expertise, knowledge, or characteristic of the user (e.g., fluent in Spanish, proficient in C#). In embodiments, the set of user profile data may include a relational user experience. The relational user experience may include an activity, task, or area that the user is familiar with/has worked with in the past (e.g., presentation experience, experience working as the Vice President of Sales at an international company). As described herein, in embodiments, the set of user profile data may be structured to include a relationship of the intended recipient user with respect to a set of other users indicated in the message. For instance, the set of user profile data may be organized to emphasize, highlight, or otherwise indicate correlations or links between the characteristics of the intended recipient user with respect to other recipients of the communication (e.g., intended recipient user and User A both have experience working with the same field/area). Other types of profile data elements and methods of structuring the set of user profile data are also possible.

In embodiments, a to-do-list entry may be established in the social networking environment for utilization to manage the anticipated activity at module 451. Generally, establishing can include creating, instantiating, forming, producing, or otherwise generating the to-do-list entry. In embodiments, the to-do-list entry may include a memo, record listing, or data item that indicates a particular task or action to be performed (e.g., by the intended recipient user). As an example, the to-do-list entry may include a digital memo stating "Prepare presentation materials." As another example, the to-do-list entry may include a data item in a list stating "Reserve Meeting Room." In embodiments, the to-do-list entry may be established based on the relevant actionable portion of a message. For instance, in response to identifying a relevant actionable portion of a message of "grant proposal needs to be re-written to account for new test results," a to-do-list entry of "Rewrite the grant proposal" may be automatically generated and appended to the to-do-list of a user. Other methods of establishing the to-do-list entry are also possible.

In embodiments, a follow-up entry may be established in the social networking environment for utilization to manage the anticipated activity at module 452. Generally, establishing can include creating, instantiating, forming, producing, or otherwise generating the follow-up entry. In embodiments, the follow-up entry may include a reminder, notification, hint, suggestion, or other activity that relates to a previously performed action. As an example, the follow-up entry may include a pop-up notification reminding a user to "Verify the status of the program installation." In embodiments, the follow-up entry may include a status entry created by an assessment widget configured to evaluate the efficacy of a particular activity management operation (e.g., based on automated assessment criteria or user feedback data). As an example, the follow-up entry may include a dialogue box asking a user to rate the efficacy of a an activity management operation that was performed to set up a meeting. The user may provide feedback data (e.g., satisfaction level, star rating, effectiveness score) via the follow-up entry, and the collected data may be used to facilitate determination of future activity management operations. Other methods of establishing the follow-up entry are also possible.

In embodiments, a data file may be established in the social networking environment for utilization to manage the anticipated activity at module 453. Generally, establishing can include creating, instantiating, forming, producing, or otherwise generating the data file in the social networking environment. In embodiments, the data file may include an information resource maintained in a computer readable format. As examples, the data file may include presentation files, word processor files, spreadsheet files, video files, audio files, executable files, or other types of computer data. In embodiments, establishing may include uploading the data file to a social network file sharing server (e.g., where it may be accessed by other users). In embodiments, establishing may include transmitting the data file from a first user of the social networking environment to a second user of the social networking environment. As an example, in certain embodiments, establishing may include posting a presentation file to a group discussion forum (e.g., so other members of the group may access, review, and discuss the presentation). Other methods of establishing the data file are also possible.

In embodiments, an indication that a candidate user action has been performed may be presented, and the candidate user action may be disabled at module 454. As described herein, aspects of the disclosure relate to providing a candidate user action (e.g., recommended action for a user to facilitate management of the anticipated activity) in the social networking environment. Accordingly, aspects of the disclosure relate to the recognition that, once the candidate user action has been performed, it may be desirable to indicate completion of the candidate user action to one or more other users of the social networking environment. In embodiments, an indication that the candidate user action has been performed may be presented (e.g., displayed, delivered, conveyed, relayed, sent) in the social networking environment. The indication that the candidate user action has been performed may include a notification, memo, pop-up, or other user interface element to communicate completion of the candidate user action. In embodiments, presenting the indication may include deleting (e.g., crossing-off) a to-do-list entry that corresponds to the candidate user action from the to-do-list of one or more users. In embodiments, presenting the indication may include sending a message (e.g., reply email) to one or more users indicating the nature of the candidate user action, who it was performed by, and when it was completed. In embodiments, presenting the indication may include dynamically modifying the content of the message, and appending an action completion tag to the relevant actionable portion of the message with which the candidate user action was associated.

In embodiments, multiple performances of the candidate user action may be disabled in the social networking environment. Generally, disabling can include disallowing, preventing, denying, or invalidating multiple performances of the candidate user action. In embodiments, disabling may include removing the candidate user action from a shared list of uncompleted candidate user actions (e.g., such that the candidate user action may not be performed again by other users). In embodiments, in response to receiving user input attempting to perform the candidate user action, disabling may include denying access to the functions or operations associated with the candidate user action. Consider the following example. A group of users including User A, User B, and User C may receive an email message. A relevant actionable portion of "set up a meeting" may be identified, and a candidate user action of a user interface prompt to set up a meeting (e.g., reserve a conference room, select a data and time) may be delivered to all three users. In embodiments, User B may be the first to respond to the email, and perform the candidate user action by setting up an email. Accordingly, in embodiments, Users A and C may receive a notification that the meeting has been set up by User B, and the user interface prompt to set up the meeting may be removed from the social networking environment of Users A and C. Other methods of presenting an indication of candidate user action completion and disabling multiple performances of the candidate user action are also possible.

In embodiments, aspects of the disclosure relate to using information pertaining to user actions to determine future recommended actions for a particular user at module 455. In embodiments, a candidate user action may be collected (e.g., in response to determining the activity management operation). Generally, collecting can include receiving, recognizing, identifying, or otherwise capturing the candidate user action. In embodiments, collecting may include ascertaining the nature, function, or operations of a candidate user action provided to a user (e.g., set up a meeting). In embodiments, a set of performed user actions (e.g., tasks, procedures, series of operations) may be recorded in response to executing the activity management operations. Generally, recording can include logging, registering, saving, documenting, or otherwise storing the set of performed user actions. In embodiments, recording may include analyzing a user activity log to determine what software programs were opened, what functions were selected, the sequence of the selected operations, the result of the operations, and other information related to the set of performed user actions. In embodiments, a set of future recommended user actions may be determined based on the set of performed user actions. Generally, determining can include computing, formulating, identifying, generating, deriving, or otherwise ascertaining the set of future recommended user actions. The set of future recommended user actions may include tasks, activities, procedures, or other operations that may be associated with efficiency, flexibility, performance, or other positive impacts with respect to the set of performed user actions. In embodiments, determining may include analyzing the set of performed user actions, and ascertaining other actions that could be used to perform the same function while requiring less time, manpower, computing functions, or other resource. In embodiments, the set of future recommended user actions may be used to facilitate management of a related anticipated activity (e.g., future activity similar in goal, function, or content to the anticipated activity). Other methods of determining the set of future recommended user actions to manage the anticipated activity are also possible.

Consider the following example. A candidate user action of "Generate a budget" may be recognized and collected. In response to providing the candidate user action to a user, a set of performed user actions may be recorded using a user activity log. For instance, it may be recorded that the user opens a spreadsheet creation application, creates row and column titles, inserts budget items and currency values, and then performs one or more arithmetic operations to generate deficits and surpluses for different budget items. Accordingly, as described herein, the performed user actions recorded in the user activity log may be analyzed, and a set of future recommended user actions may be determined. As an example, a future recommended user action of "Import a budget template" may be determined (e.g., a user may be able to utilize a pre-created budget template rather than generating it him/herself). In embodiments, the set of future recommended user actions may be provided (e.g., displayed, presented) to the user in the social networking environment as candidate users actions for future anticipated events. In embodiments, the set of future recommended user actions may be used to facilitate determination of activity management operations to manage the anticipated activity.

Figure 5:
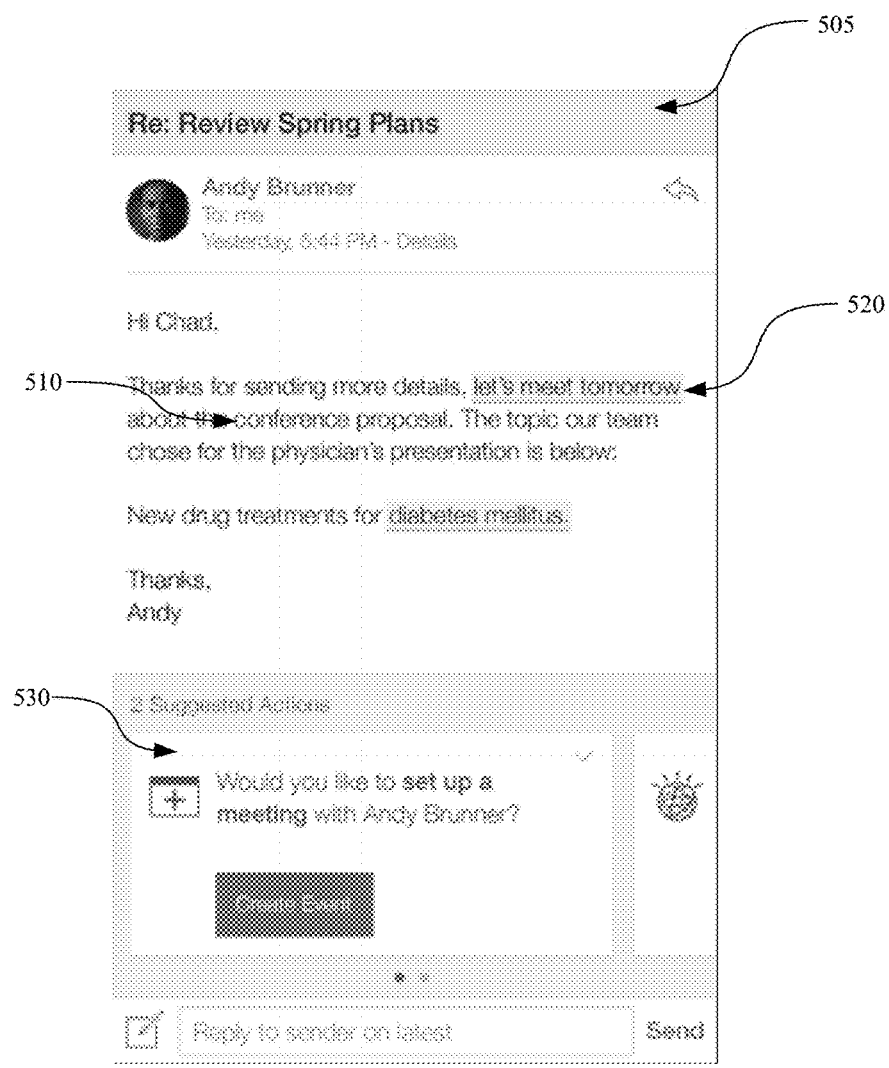
FIG. 5 depicts an example system for message management in a social networking environment, according to embodiments.

FIG. 5 depicts an example system 500 for message management in a social networking environment, according to embodiments. Aspects of FIG. 5 relate to analyzing a message 505 pertaining to an anticipated activity 510. Using a relevant actionable portion of the message 520 which corresponds with the anticipated activity 510, an activity management operation 530 may be determined and executed in the social networking environment. In embodiments, aspects of FIG. 5 may substantially correspond to other embodiments described herein and illustrated in the FIGS. 1-6.

In embodiments, as described herein, a message 505 which pertains to an anticipated activity 510 may be detected. As described herein, the message 505 may include an email, text message, private chat, or other form of communication between two or more users. In embodiments, the anticipated activity 510 may include a meeting, conference, presentation, project, speech/address, or other future event. For instance, as shown in FIG. 5, in certain embodiments, the anticipated event 510 may include an upcoming conference proposal related to treatments for diabetes mellitus. A natural language processing technique may be used to analyze the message and determine a relevant actionable portion 520 of the message that corresponds with the anticipated activity 510. As an example, a suggestion of "let's meet tomorrow" (e.g., for discussion of the conference proposal) may be identified as the relevant actionable portion 520. Using the relevant actionable portion of the message 520, an activity management operation 530 may be determined for utilization to management the anticipated activity 510. For instance, the natural language processing technique may recognize that the presence of the word "meet" in the relevant actionable portion 520 may indicate a suggestion of a "meeting," and that the volitional form of the word "let's" implies that the sender of the communication may be one potential participant in a meeting. Accordingly, based on the semantic and syntactic content of the relevant actionable portion 520, an activity management operation 530 may be determined. As an example, the activity management operation 530 may include a prompt to "set up a meeting" between the sender and the recipient of the message 505. In embodiments, the activity management operation 530 may be executed in the social networking environment to select a time, location, and other participants of the meeting. Other methods of managing the message 505 are also possible.

Figure 6:
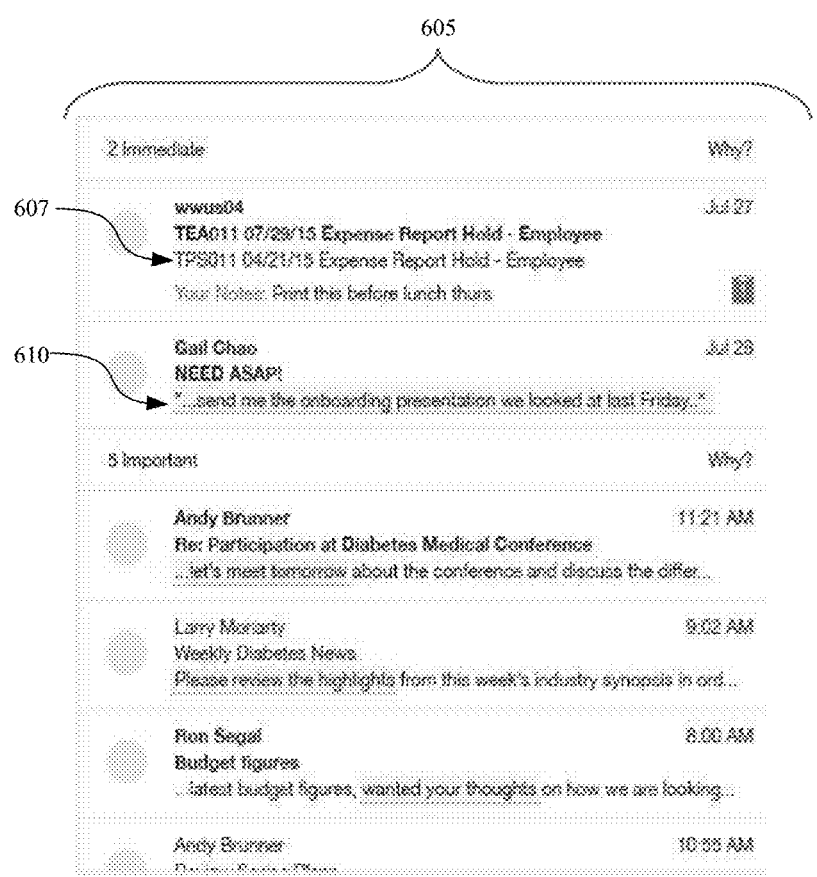
FIG. 6 depicts an example system for message management in a social networking environment, according to embodiments.

FIG. 6 depicts an example system 600 for message management in a social networking environment 605, according to embodiments. Aspects of FIG. 6 relate to providing a cropped message 610 within a social networking environment 605 to indicate the relevant actionable portion of the message to a user. As described herein, the social networking environment 605 may include an email management interface. The email management interface may be populated by email messages received from a number of different users. In embodiments, one or more emails in the email management interface may include a message preview space 607 to display a portion of the following email content. As described herein, aspects of the disclosure relate to leveraging the message preview space 607 to display a cropped message 610. In embodiments, the cropped message 610 may be configured to indicate the relevant actionable portion of the message to users of the email management interface. For instance, as shown in FIG. 6, the cropped message 610 may be structured to include a relevant actionable portion of "send me the onboarding presentation we looked at last Friday." In this way, the portion of the message that relates to a task to be performed by a recipient of the message may be emphasized to facilitate message management. Other methods of providing the cropped message 610 and indicating the relevant actionable portion of a message to a user are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for message management utilizing a social networking environment, the method comprising:
   detecting, in the social networking environment, a message pertaining to multiple anticipated activities;
   analyzing the message to identify relevant actionable portions of the message corresponding with each of the anticipated activities, wherein each of the identified relevant actionable portions indicate one or more operations associated with each of the anticipated activities;
   determining, for each recipient of the message, a list of the associated operations, wherein completion of each of the anticipated activities depends on the performance of one or more of the associated operations,
   assigning each of the associated operations to respective recipients of the message based on a similarity between a set of user profile data for each recipient and each of the associated operations, wherein different associated operations are assigned to different recipients based on a respective set of user profile data for each recipient;
   providing, in the social networking environment, a candidate user action for each of the assigned associated operations to the respective recipients of the message; and
   executing, in the social networking environment, each of the associated operations based on each recipient's response to respective candidate user actions.

2. The method of claim 1, further comprising:
   cropping the relevant actionable portions of the message to form one or more cropped messages; and
   providing, in the social networking environment, the one or more cropped messages to the respective recipients of the message.

3. The method of claim 2, further comprising:
   displaying, in the social networking environment, the one or more cropped messages to the respective recipients of the message without increasing a display space allotted to the message.

4. The method of claim 1, further comprising:
   analyzing the message using a natural language processing technique to identify the relevant actionable portions of the message corresponding with each of the anticipated activities.

5. The method of claim 4, further comprising:
configuring the natural language processing technique to parse a set of features selected from the group consisting of:
an action-oriented feature,
a user-oriented feature, and
a temporal-oriented feature.

6. The method of claim 1, further comprising:
arranging each of the anticipated activities using the relevant actionable portions of the message.

7. The method of claim 6, further comprising:
prioritizing each of the anticipated activities based on a set of elements of the relevant actionable portions of the message, wherein the set of elements is selected from the group consisting of:
an indicated task-type,
an indicated urgency, and
a set of indicated users.

8. The method of claim 1, wherein analyzing the message to identify the relevant actionable portions of the message comprises:
ascertaining, with respect to the message, an intended recipient user; and
comparing the message and a set of user profile data for the intended recipient user.

9. The method of claim 8, further comprising:
structuring the set of user profile data for the intended recipient user to include a relationship of the intended recipient user with respect to a set of other users indicated in the message having an indication that is selected from the group consisting of:
a relational user history,
a relational user background,
a relational user role,
a relational user function,
a relational user skill, and
a relational user experience.

10. The method of claim 1, further comprising:
establishing, in the social networking environment, a to-do-list entry to manage each of the anticipated activities.

11. The method of claim 1, further comprising:
establishing, in the social networking environment, a follow-up entry to manage each of the anticipated activities.

12. The method of claim 1, further comprising:
establishing, in the social networking environment, a data file to manage each of the anticipated activities.

13. The method of claim 1, further comprising:
presenting, in the social networking environment, an indication that one or more of the candidate user actions have been performed; and
disabling, in the social networking environment, multiple performances of the one or more candidate user actions.

14. The method of claim 1, further comprising:
collecting the candidate user actions in response to determining the list of associated operations;
recording, in response to executing, a set of performed user actions; and
determining, based on the set of performed user actions, a set of future recommended user actions to manage a related anticipated activity.

15. The method of claim 1, wherein the detecting, the analyzing, the determining, the assigning, the providing, and the executing each occur in a dynamic fashion to streamline message management.

16. The method of claim 1, wherein the detecting, the analyzing, the determining, the assigning, the providing, and the executing each occur in an automated fashion without user intervention.

* * * * *